(12) United States Patent
Law

(10) Patent No.: US 7,121,568 B2
(45) Date of Patent: Oct. 17, 2006

(54) MOTORCYCLE HANDLEBAR MOUNTING SYSTEM

(76) Inventor: Johnny Law, 533 Alameda Padre Serra, Santa Barbara, CA (US) 91303

( * ) Notice: Subject to any disclaimer, the term of this patent is extended or adjusted under 35 U.S.C. 154(b) by 43 days.

(21) Appl. No.: 10/990,826

(22) Filed: Nov. 16, 2004

(65) Prior Publication Data

US 2005/0116442 A1    Jun. 2, 2005

Related U.S. Application Data

(60) Provisional application No. 60/480,755, filed on Nov. 28, 2003.

(51) Int. Cl.
*B62K 11/14*    (2006.01)

(52) U.S. Cl. .................. 280/280; 280/279; 280/288.4; 74/551.1

(58) Field of Classification Search ............... 280/279, 280/280, 288.4; 74/551.1, 551.2, 551.3, 74/551.4, 551.5, 551.6, 551.7, 551.8, 551.9
See application file for complete search history.

(56) References Cited

U.S. PATENT DOCUMENTS

| 6,036,339 | A | * | 3/2000 | Idoeta .................... 362/476 |
| 6,122,991 | A | * | 9/2000 | Clarkson ................. 74/551.8 |
| 6,332,625 | B1 | * | 12/2001 | Fukunaga et al. ......... 280/280 |
| 6,682,088 | B1 | * | 1/2004 | Lin ........................ 280/280 |
| 6,837,508 | B1 | * | 1/2005 | Francis et al. ........... 280/276 |

* cited by examiner

*Primary Examiner*—Lesley D. Morris
*Assistant Examiner*—Marc Scharich
(74) *Attorney, Agent, or Firm*—Michael G. Petit

(57) ABSTRACT

Handlebars for a motorcycle and a system for mounting the handlebars on the front fork tubes of the motorcycle. When mounted on the motorcycle, the handlebars extend the line of the fork tubes to terminate laterally in handgrips. The handlebars provide the illusion that the front fork tubes continue upwardly through the upper triple tree to form the handlebars. The handlebars and mounting system comprise a pair of handlebars attached to a base plate that anchors flush into a recess in the upper triple tree. The handlebars and mounting system provide means for concealing wiring, bolts, nuts, stem and fork tube plugs from sight while retaining the functionality of the handlebars.

8 Claims, 3 Drawing Sheets

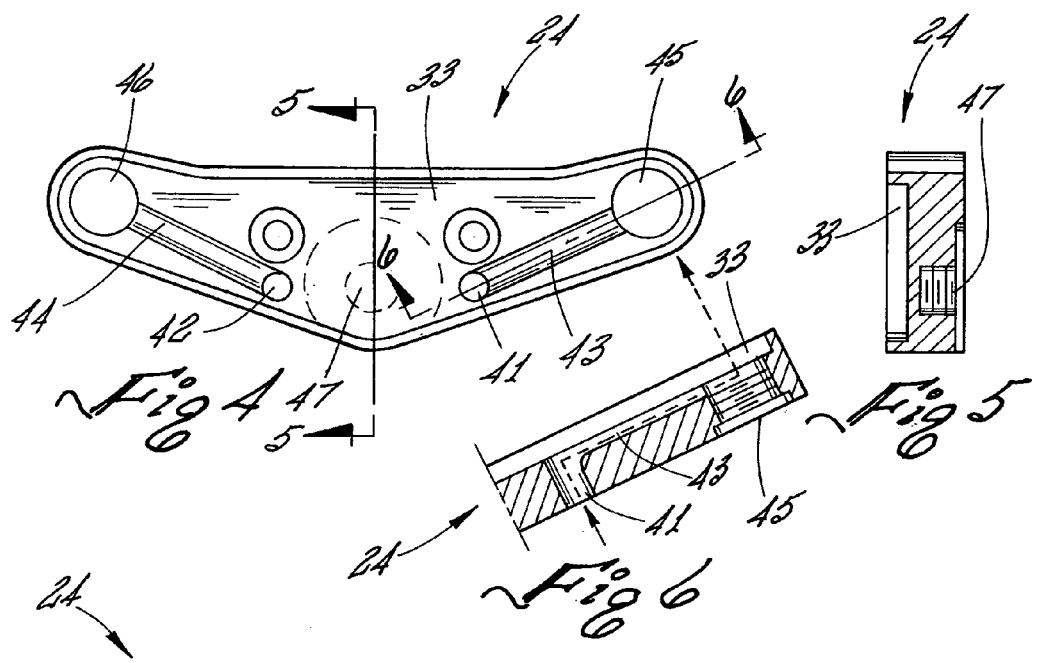
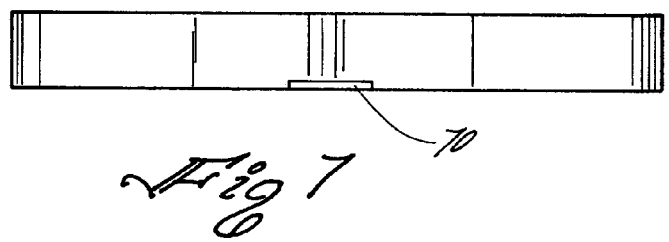
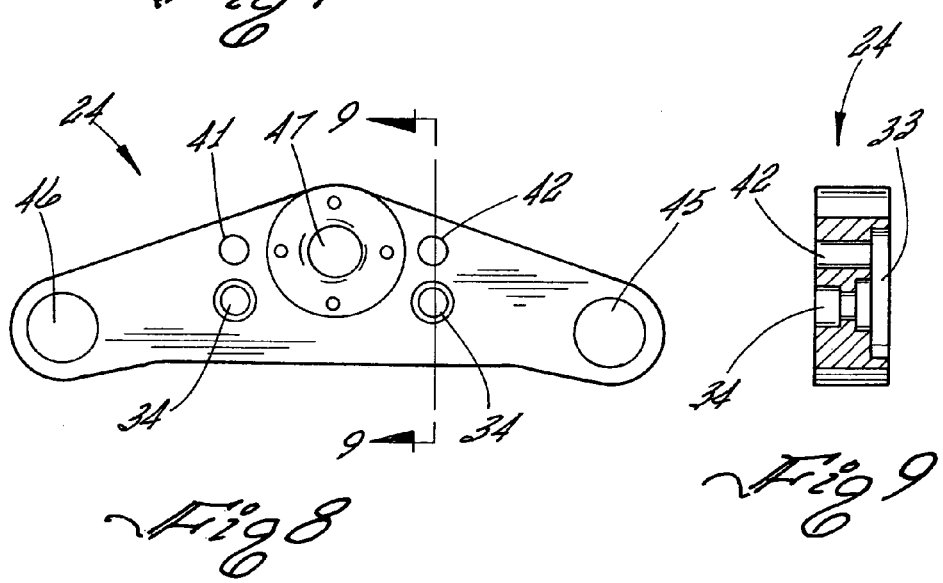

MOTORCYCLE HANDLEBAR MOUNTING SYSTEM

This application claims the benefit of U.S. Provisional Application No. 60/480,755, filed Nov. 28, 2003.

BACKGROUND OF THE INVENTION

1. Field of the Invention

The present invention relates to motorcycle handlebars and more particularly, to a kit for mounting handlebars in-line with the front forks of a motorcycle.

2. Prior Art

An example of a motorcycle 10 having handlebars 11 conventionally mounted in accordance with the prior art is illustrated in perspective view in FIG. 1. The prior art handlebars 11 are mounted to the front forks 12a and 12b by means of an upper triple tree 13 and a lower triple tree 14. The handlebars 11 are comprised of a single length of tubing attached to the upper triple tree 13 and supported by a pair of symmetrically spaced struts 15 bolted to the upper triple tree 13 and the handlebar 11. The upper triple tree 13 is attached to the lower triple tree 14 by means of a stem 16 which lies along the axis of rotation of the front forks. The handlebar mounting arrangement in prior art motorcycles 10, such as shown in FIG. 1, interrupts the smooth flow of a line between the forks 12a and 12b and the handlebars 11. The offset of the struts 15 from the line of the forks 12a and 12b is aesthetically displeasing and aerodynamically and mechanically inefficient due to turbulent air flow and the relatively small moment arm of the closely spaced struts 15. It is, therefore, desirable to provide a motorcycle handlebar mounting system that provides continuity between the line of flow of the handlebars and the front forks.

SUMMARY

The present invention is directed to a motorcycle handlebar and a handlebar mounting system for mounting the handlebars on the front forks of a motorcycle that substantially obviates one or more of the limitations of the related art. An example of a motorcycle that includes a handlebar mounting system that integrates the handlebars and the upper and lower triple trees in accordance with the present invention is illustrated in perspective view in FIG. 2.

The motorcycle 20 has two substantially straight, parallel front fork tubes 12a and 12b. The front fork tubes 12a and 12b have a diameter and are connected to one another at an upper end thereof by an upper triple tree 24. Two tubular handlebars 21 and 22 have a medial end that is attached to a base plate. The base plate is, in turn, attached to the upper triple tree such that the medial end of each of the handlebars is coaxial with one of the front fork tubes.

The present invention improves the conventional handlebar mounting system by building handlebars that consist of metal tubes having handgrips on lateral ends thereof that are adapted to be gripped by a rider. The medial end of the handlebars are mounted above the uppermost ends of the fork tubes to a flat metal base plate which is attached to a recess within the upper triple tree. The base plate and handlebars allow the tubular portion of the handlebars to extend out of the upper triple tree directly above the respective ends of the fork tubes. The invention allows the handlebars to mount in their natural position above the fork tubes while concealing wiring, bolts, nuts, stem and fork tube plugs.

The motorcycle handlebar assembly comprises: (a) a lower triple tree having fork attachment means operable for connecting the two front fork tubes of the motorcycle to one another and disposed between the upper and lower ends of the front fork tubes; (b) an upper triple tree having fork attachment means operable for connecting the upper ends of the front fork tubes to one another and an upper surface; (c) a flat base plate having an upper surface and two fork tube mounting holes therein; (d) two tubular handlebars having a medial end, a lateral end and a central conduit. The medial end of each of the handlebars is affixed to the base plate to overlie the fork tube mounting holes therein. The base plate includes attachment means operable for attaching the base plate to the upper surface of the upper triple tree.

The lower triple tree has a hole therein that is dimensioned to enable the passage of one or more wires through the lower triple tree. The handlebar assembly further includes a stem comprising an elongate member having triple tree attachment means on opposing ends thereof operable for connecting the upper triple tree to the lower triple tree at a midportion thereof. The upper surface of the upper triple tree has a recess therein dimensioned to receive the base plate. The upper triple tree has two wiring trench input holes therein and the base plate recess in the upper triple tree has two wiring trenches machined therein operable for providing a conduit for receiving and passing one or more wires from the wiring trench input holes through the fork tube mounting holes into the central conduit in the handlebars. The handlebars have a slot therein disposed between the medial end and the lateral end thereof, the slot being dimensioned to enable one or more wires within the central conduit to exit the central conduit. The assembly also includes a rubber gasket interposed between the base plate and the upper triple tree.

The features of the invention believed to be novel are set forth with particularity in the appended claims. However the invention itself, both as to organization and method of operation, together with further objects and advantages thereof may be best understood by reference to the following description taken in conjunction with the accompanying drawings.

BRIEF DESCRIPTION OF THE DRAWINGS

FIG. 3 also illustrates the structural relationship between the handlebars, upper triple tree, lower triple tree, stem and fork tubes.

FIG. 4 is a top view of the upper triple tree showing the wiring trenches cut into the recessed portion that accepts the base plate.

FIG. 5 is a cross section of the upper triple tree taken along section line 5—5 of FIG. 4.

FIG. 6 is a cross section view of the upper triple tree taken along section line 5—5 of FIG. 4, illustrating the wiring route through the wiring trenches by a dashed arrow, and a threaded hole for receiving the fork tube plugs.

FIG. 7 is a side view of the upper triple tree.

FIG. 8 is a bottom view of the upper triple tree of FIGS. 4–7. The shows the wiring trench input holes and fastening points for the socket head cap screws that mount to the base plate to the upper triple tree and the fork tube plug mounting points.

FIG. 9 is a cross section view of the upper triple tree taken along section line 9—9 of FIG. 8.

DESCRIPTION OF THE PREFERRED EMBODIMENTS

Figure 1:
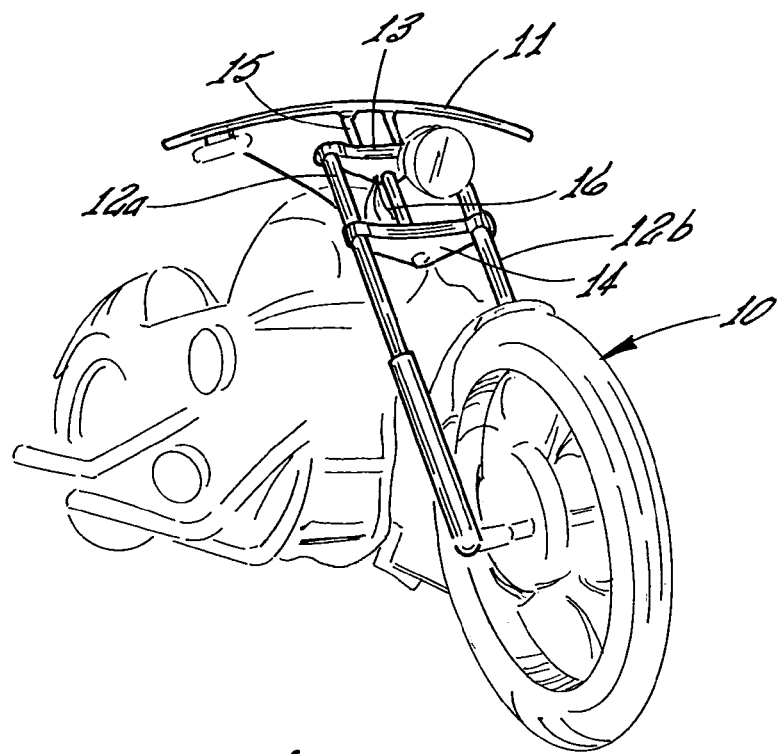
FIG. 1 is a perspective view of a motorcycle having conventional handlebars mounted to conventional triple trees in accordance with the prior art.
Figure 2:
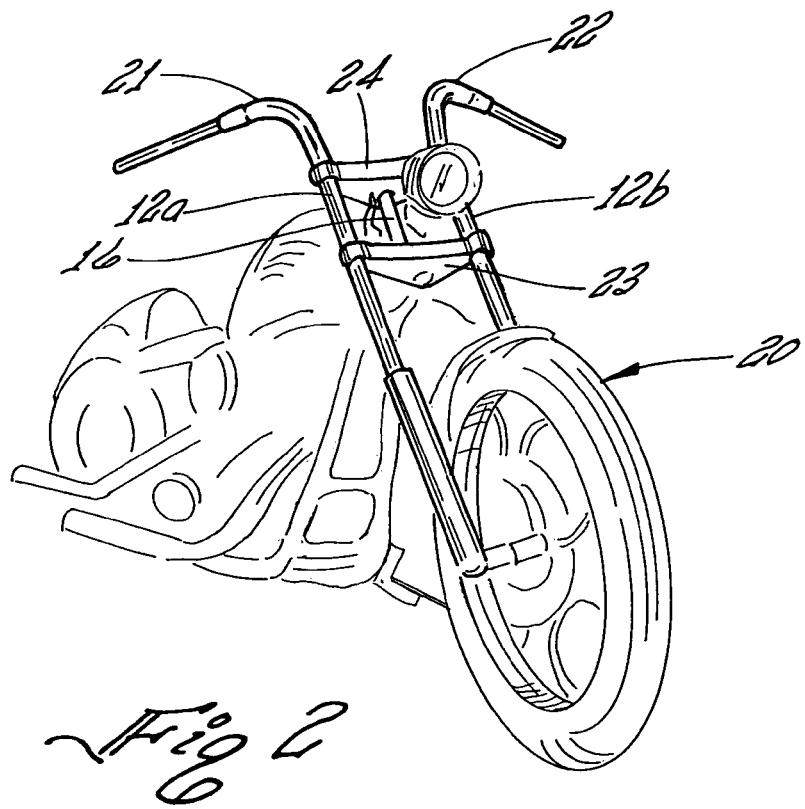
FIG. 2 is a perspective view of a motorcycle having handlebars mounted to the front forks of a motorcycle by novel triple trees in accordance with the present invention wherein the base plate, which is securely housed within a recess in the upper triple tree by bolts, and the handlebars are formed as an integral unit.

Turning first to FIG. 2, a motorcycle having handlebars in accordance with the present invention is indicated at numeral 20. The lower triple tree 23 and the stem 16 are similar to the corresponding parts in accordance with the prior art. The handlebars 21 and 22 and the upper triple tree 24 are, however, different from the corresponding parts in accordance with the prior art in both their structure and function as will be discussed in detail below.

Figure 3:
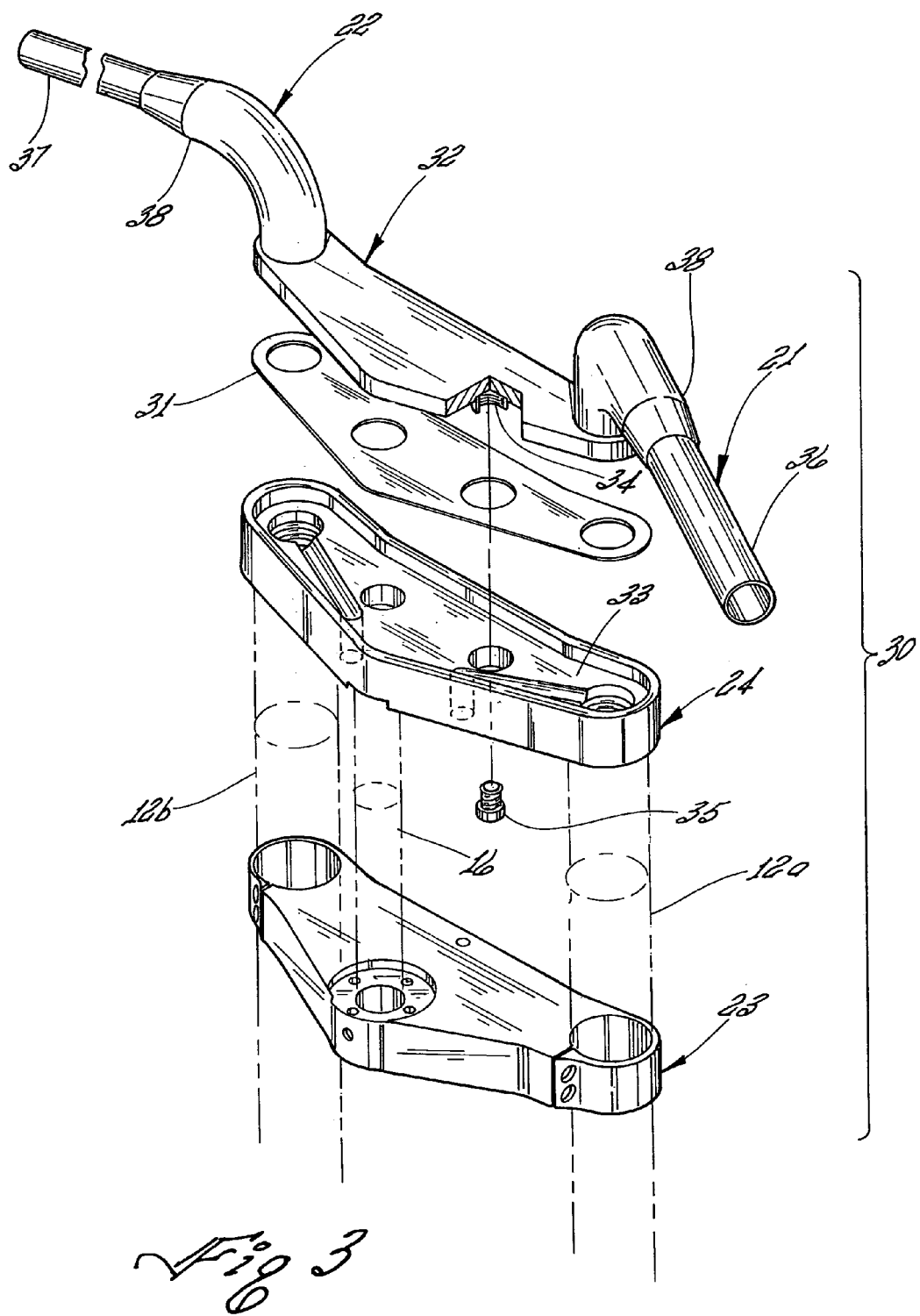
FIG. 3 is an exploded perspective view showing the handlebars, which are attached to the steel base plate, anchored into the recessed portion of the upper triple tree by the socket head cap screws. A rubber gasket is interposed between the base plate and the recess in the upper triple tree.

Turning next to FIG. 3, which is an exploded perspective view of the handlebar mounting assembly 30 showing the handlebars 21 and 22, which are attached to the steel base plate 32. The handlebars 21 and 22 terminate laterally in handgrips 36 and 37 respectively. FIG. 3 illustrates the structural relationship between the handlebars 21 and 22, the base plate 32, the upper triple tree 24, the lower triple tree 23, the stem 16 and fork tubes 12a and 12b. The base plate 32 (partially cutaway to show the threaded female member 34) is anchored into the recessed portion 33 of the upper triple tree 24 by two socket head cap screws 35 (only one shown in FIG. 3) which are received by matingly threaded female members 34 welded to the lower surface of the base plate 32. A rubber gasket 31 is interposed between the base plate 32 and the recess 33 in the upper triple tree 24. The rubber gasket 31 seals the interface between the base plate and the upper triple tree against the ingress of moisture and provides shock absorption for the handlebars. The handlebars 21 and 22 are hollow tubes having wiring pass-through slots 38 therein (not visible in FIG. 3) that permit exit of wires from within the handlebars. The slots 38 may be lined with a soft grommet to prevent chafing of the insulated jacket on the wires passing through the slots. The lateral ends of the handlebars 21 and 22 have handgrips 36 and 37 thereon which are adapted to be grasped by a rider.

With reference now to FIGS. 4–9, the figures show different views of the upper triple tree 24. FIG. 4 is a top view of the upper triple tree 24 with the base plate 32 removed to illustrate the features thereof. The upper triple tree 24 is preferably a single piece of aluminum (6061 t6 aluminum) or steel having an upper surface with a recess 33 therein and an opposing lower surface (shown in FIG. 8). A pair of holes 41 and 42 provide feed through path(s) for passing wiring for controls and/or meters from the lower surface of the upper triple tree into wiring trenches 43 and 44 grooved into the upper surface of the upper triple tree within the recessed portion 33. The path followed by the control wires through the feed through holes 41 and 42 and wiring trenches 43 and 44 is shown by the dashed arrow in FIG. 6. The wires (not shown) exit the wiring trenches and enter the central conduit of the respective handlebars in the direction illustrated by the dashed arrow in FIG. 6, thereafter to exit the handlebars through slots 38 (FIG. 3) to be connected to respective motorcycle control elements to perform their intended function. FIG. 5 is a cross section of the upper triple tree 24 taken along section line 5—5 of FIG. 4. A recess 47 in the lower surface of the upper triple tree receives, and is affixed to, the upper end of stem 16.

FIG. 7 is a side view of the upper triple tree 24. A circular portion 70 of the lower surface of the upper triple tree is recessed to house a bearing and collar (not shown). FIG. 8 is a bottom view of the upper triple tree of FIGS. 4–7. FIG. 8 shows the wiring trench input holes 41 and 42 and fastening points 34 for the socket head cap screws 35 that mount to the base plate 32 to the upper triple tree. The fork tube plug mounting points are indicated at numerals 45 and 46. The inner surface of the fork tube plug mounting points 45 and 46 are threaded to receive a cylindrical plug (not shown) that is threaded on both ends thereof. One end of the plug has male threads thereon that matingly engage the female thread on the front fork tube plug mounting points 45 and 46. The opposing end of the plug has a male thread on the outer surface thereof adapted to matingly engage a female thread on the inner surface of the front fork tube thereby affixing the upper triple tree to the respective front forks 12a and 12b. FIG. 9 is a cross section view of the upper triple tree taken along section line 9—9 of FIG. 8.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

I claim:

1. A handlebar assembly for a motorcycle, the motorcycle having two front fork tubes, the front fork tubes being substantially parallel to one another and having a fixed lower end and a free upper end, the handlebar assembly comprising: (a) a lower triple tree having fork attachment means operable for connecting said two front fork tubes to one another and disposed between said free ends and said fixed ends of said front fork tubes, said lower triple tree having a hole therein dimensioned to enable the passage of one or more wires through said lower triple tree; (b) an upper triple tree having fork attachment means operable for connecting said free upper ends of said front fork tubes to one another, an upper surface and a lower opposing surface, said upper triple tree having at least one wiring trench input hole therein; (c) a flat base plate having an upper surface and a hole therein dimensioned to enable the passage of one or more wires therethrough; (d) two tubular handlebars having a length and a central conduit coextensive with said length, a medial end and a lateral end, said lateral end projecting upwardly from said upper surface of said base plate, said medial end of said handlebars affixed to said base plate to overlie fork tube mounting holes therein, said base plate having attachment means thereon operable for attaching said base plate to said upper surface of said upper triple tree and at least one hole therein dimensioned to enable the passage of one or more wires therethrough.

2. The handlebar assembly of claim 1 further comprising a stem comprising an elongate member having triple tree attachment means on opposing ends thereof operable for connecting said upper triple tree to said lower triple tree at a midportion thereof.

3. The handlebar assembly of claim 1 wherein said upper surface of said upper triple tree has a recess therein dimensioned to receive said base plate.

4. The handlebar assembly of claim 3 wherein said recess in said upper triple tree has two wiring trenches therein operable for providing a conduit for receiving and passing one or more wires from said wiring trench input holes through said fork tube mounting holes into said central conduit in said handlebars.

5. The handlebar assembly of claim 4 further comprising a rubber gasket interposed between said base plate and said recess in said upper triple tree.

6. The handlebar assembly of claim 5 wherein said handlebars have a slot therein disposed between said medial end and said lateral end, said slot being dimensioned to enable one or more wires within said central conduit to exit said central conduit.

7. The handlebar assembly of claim 4 wherein said handlebars have a slot therein disposed between said medial end and said lateral end, said slot being dimensioned to enable one or more wires within said central conduit to exit said central conduit.

8. A motorcycle having two substantially straight, parallel front fork tubes, said front fork tubes having a diameter and being connected to one another at an upper end thereof by an upper triple tree, and two tubular handlebars having a lateral end, a medial end and a length therebetween and an axial conduit coextensive with said length, said medial end being attached to a base plate, said base plate being attached to said upper triple tree such that said medial end of each of said handlebars is coaxial with one of said front fork tubes, said base plate having a hole therein dimensioned to enable the passage of one or more wires therethrough.

* * * * *